Feb. 8, 1966   H. J. McCULLOUGH   3,233,454
SPRING TESTER
Filed Feb. 25, 1963   4 Sheets-Sheet 1
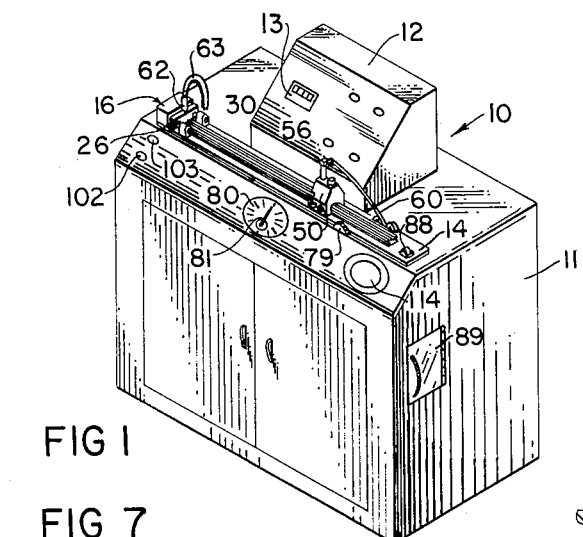
FIG 1
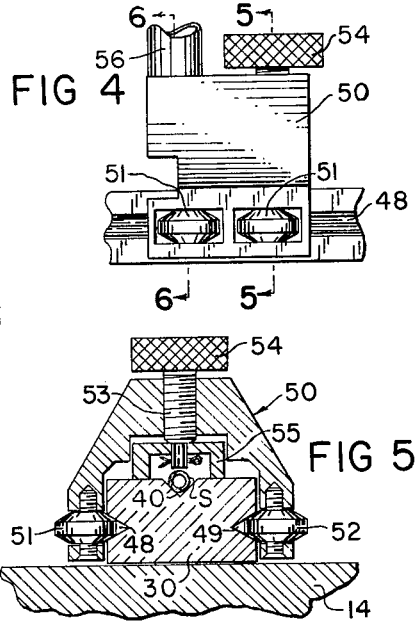
FIG 4
FIG 5
FIG 6
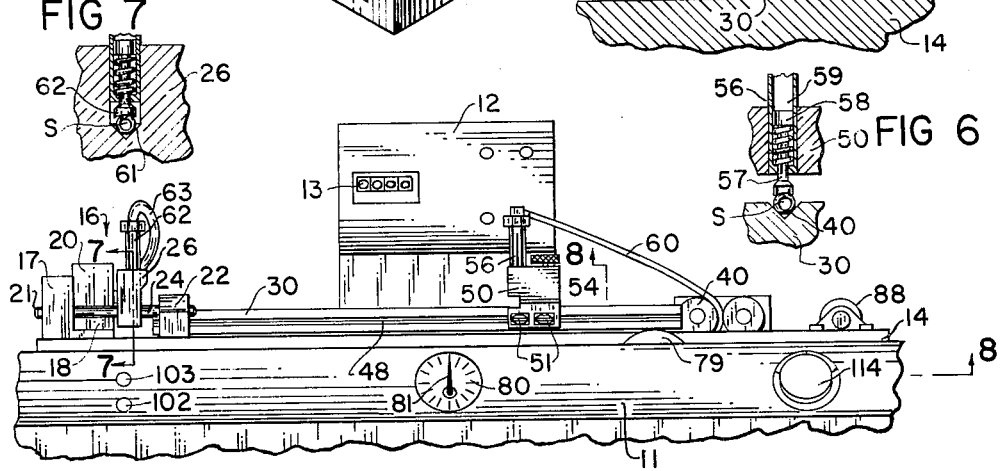
FIG 7
FIG 2
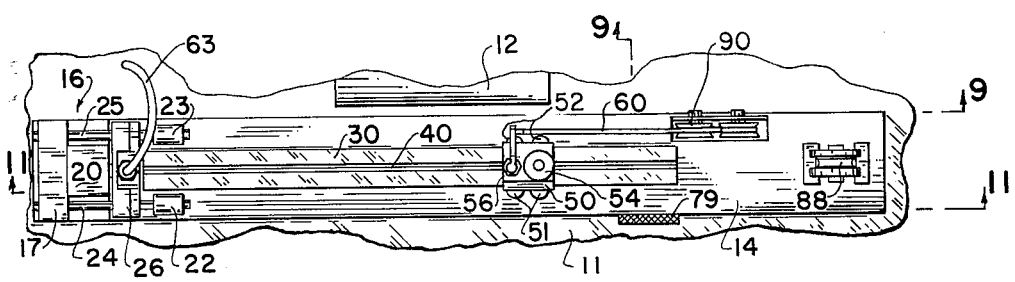
FIG 3

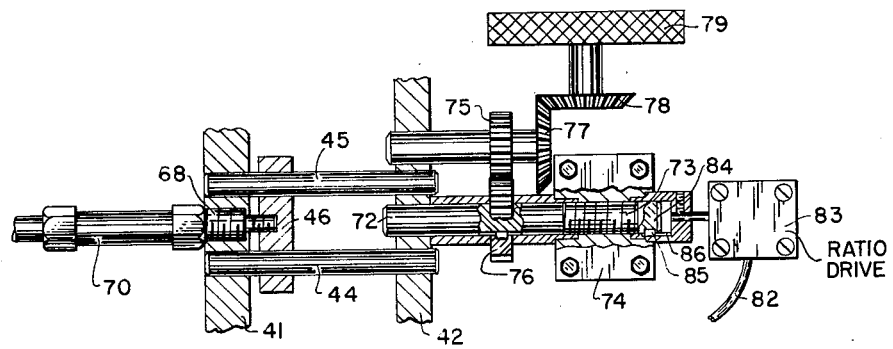
FIG 8
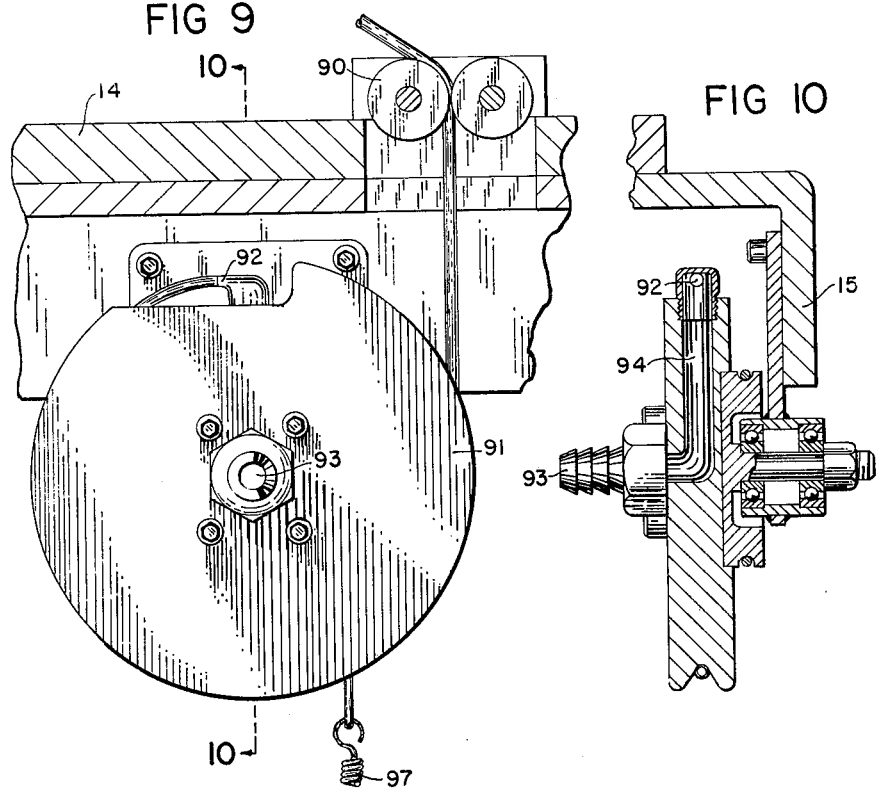
FIG 9
FIG 10

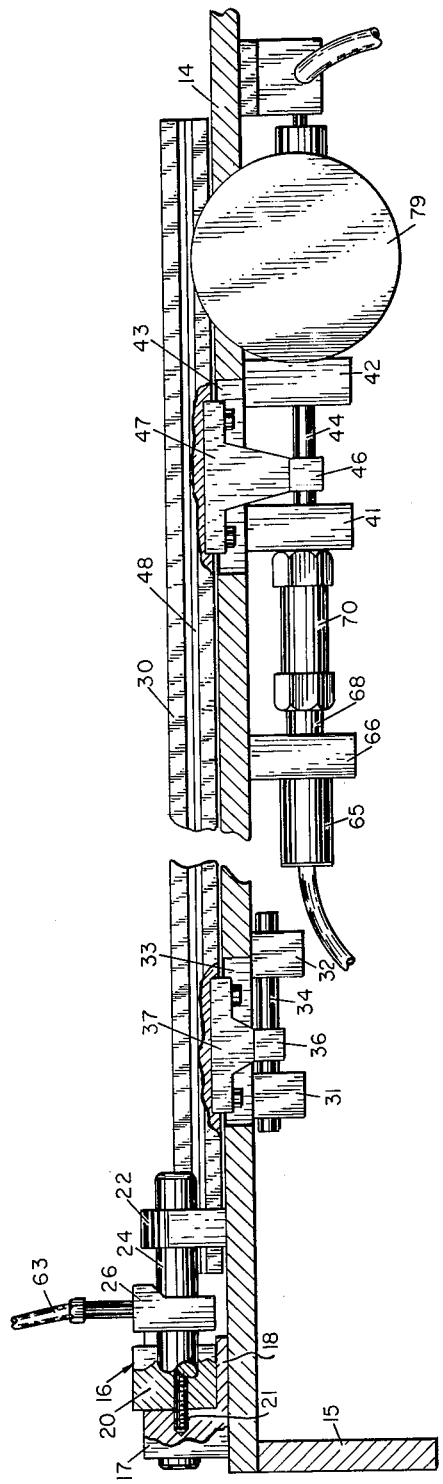

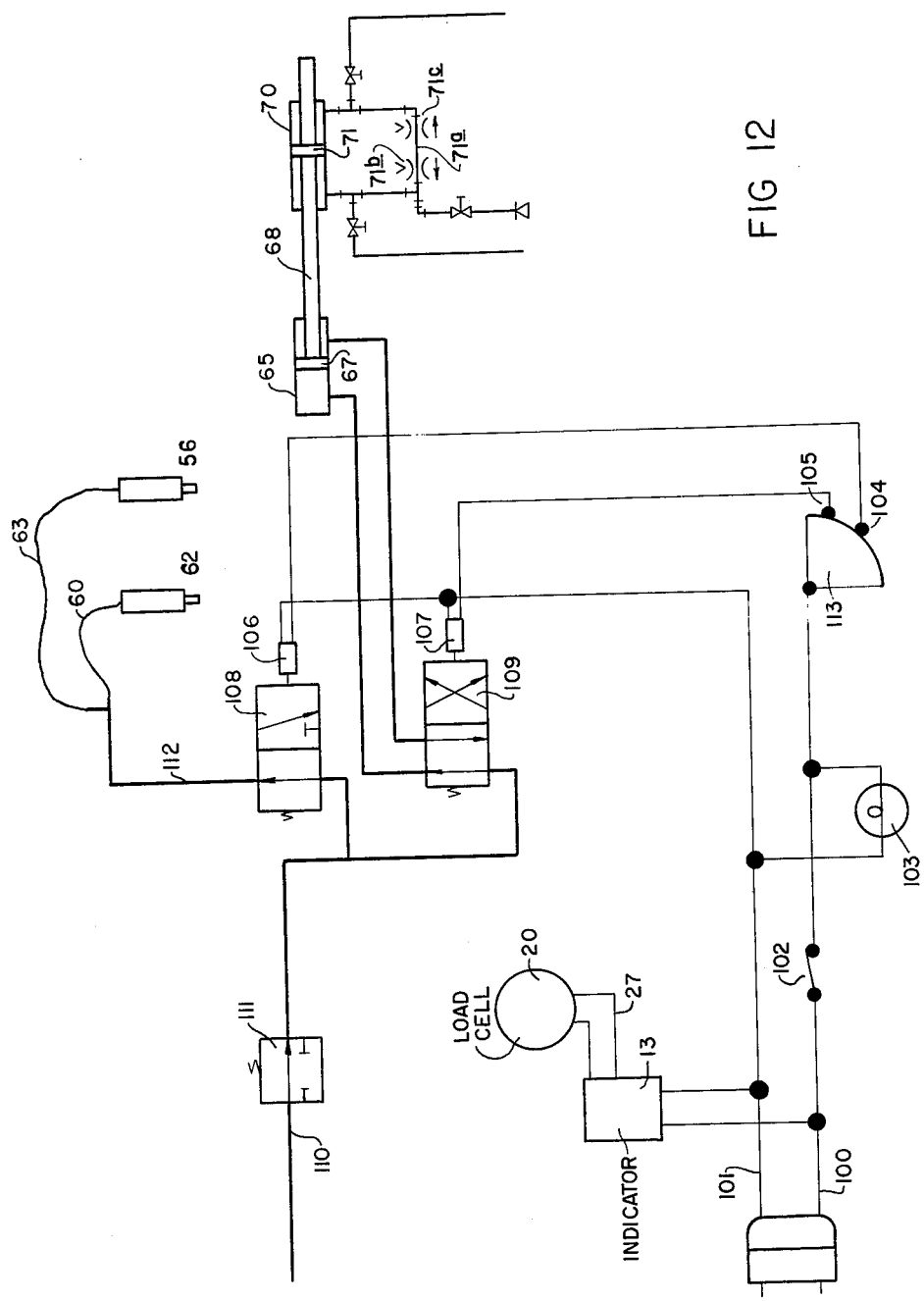

United States Patent Office 3,233,454
Patented Feb. 8, 1966

3,233,454
SPRING TESTER
Harry J. McCullough, Van Wert, Ohio, assignor to Federal-Mogul-Bower Bearings, Inc., Detroit, Mich., a corporation of Michigan
Filed Feb. 25, 1963, Ser. No. 260,618
14 Claims. (Cl. 73—161)

This invention relates to apparatus for testing the tension exerted upon extension of a spring. More particularly, it relates to a machine for testing a helical spring by stretching it a predetermined amount and noting the amount of pull exerted thereby.

Heretofore, helical-wound coil springs have usually been tested by rather primitive apparatus, often referred to as a "fish scale." In such apparatus the spring was hung vertically from a scale, its lower end was pulled down a predetermined amount, and the pull exerted was measured by the scale. More exact measurement has usually been sought by attempting to make refinements on the fish-scale apparatus, still basically following the pattern of pulling down on a vertically held spring. However, the fish-scale type of apparatus has not proven satisfactory, partly because there was also at all times a pull of gravity on the spring. This pull of gravity varies from spring to spring because of the difference of mass of the springs and cannot be satisfactorily compensated for on the fish scale.

Another problem has been to achieve a more rapid, yet more accurate, method of testing spring tension. Heretofore, procedures have been rather slow and cumbersome, and when they have been rapid, they have not been sufficiently accurate.

These and other problems that have arisen in conjunction with the manufacture of a machine designed to carry out a more rapid and accurate spring testing method, are dealt with by the invention described herein.

In the present invention, the spring is supported horizontally from beneath along the entire length of the spring. In other words, the spring rests upon a horizontal support while it is being tested; so the pull of gravity is uniform and does not set up any forces affecting measurement of the tension of the spring. The two ends of the spring are held firmly, and one end is moved away from the other end a predetermined distance while the strain exerted on the other end is measured.

Other objects, advantages, and features of the invention will appear from the following detailed description of a preferred form thereof.

In the drawings:

FIG. 1 is a view in perspective of a machine embodying the principles of the invention.

FIG. 2 is a fragmentary view in front elevation on an enlarged scale of a portion of the machine.

FIG. 3 is a top plan fragmentary view of the portion shown in FIG. 2.

FIG. 4 is an enlarged fragmentary view in front elevation of the movable clamp assembly and an adjacent portion of the member on which it moves.

FIG. 5 is a view in section taken along the line 5—5 in FIG. 4.

FIG. 6 is a fragmentary view in section taken along the line 6—6 in FIG. 4.

FIG. 7 is an enlarged view in section taken along the line 7—7 in FIG. 2.

FIG. 8 is an enlarged view in section taken along the line 8—8 in FIG. 2.

FIG. 9 is an enlarged view in section taken along the line 9—9 in FIG. 3.

FIG. 10 is an enlarged view in section taken along the line 10—10 in FIG. 9.

FIG. 11 is an enlarged view in section taken along the line 11—11 in FIG. 3, with some portions being broken to conserve space and other portions broken away to show hidden parts.

FIG. 12 is a circuit diagram of the electrical and pneumatic circuits.

As will be seen in FIG. 1, the spring-testing machine of this invention preferably incorporates a main cabinet or console 10 having a lower housing 11 and an upper housing 12. The upper housing 12 supports an indicator 13 that shows how much strain is exerted on one end of the spring S when the other end is moved. The lower housing 11 supports the remainder of the apparatus.

At the top of the lower console housing 11 is a base plate 14, itself supported by, and a portion of, a main frame 15 (FIGS. 10 and 11) which supports directly or indirectly, the other elements of the device, including the console 10; the frame 15 may be considered as the basic stationary part of the device.

At one end of the base plate 14 is a load cell assembly 16 (FIGS. 2, 3 and 11) including a load-cell mounting plate 17 rigidly secured to the base plate 14. A portion 18 of the plate 17 provides a rest that supports a load cell 20, and a suitable bolt 21 secures the load cell 20 to the plate 17, so that this end of the load cell 20 is stationary with respect to the base plate 14 and the main frame 15.

Spaced axially away from the load cell mounting plate 17 and in line with it are a pair of shaft-support members 22 and 23; these cooperate with the plate 17 to hold a parallel pair of stationary shafts 24 and 25 that extend longitudinally of the base plate 14 and above and parallel to the base plate 14. A load cell face plate 26 is supported by the shafts 24 and 25 for sliding movement along them and is connected to the other end of the load cell 20. When the face plate 26 is moved along the shafts 24 and 25 a strain is exerted on the load cell 20. In use, the amount of actual movement of the face plate 26 is very small indeed, but it is enough to exert a strain on the load cell 20, and this strain exerts the usual effect, transmitted by a suitable load cell circuit 27 (FIG. 12) to the indicator 13, showing directly the amount of strain exerted on the load cell 20.

An important part of this invention is its use of a horizontal spring-supporting member 30. For this purpose, two pairs of guide-shaft supporting members 31 and 32 (FIG. 11) are secured beneath the base plate 14 adjacent one end thereof, on opposite sides of the extremities of a slot 33 through the base plate 14, and a parallel pair of stationary longitudinal guide shafts 34 are mounted between the support members 31 and 32. A carriage slide 36 is mounted for fore and aft sliding movement on the shafts 34, and an upper portion 37 of the slide 36 extends through the slot 33 and is bolted to the spring-supporting member 30. Adjacent the other end of the base plate 14 and beneath it, a similar pair of guide-shaft supporting members 41 and 42 are disposed in similar relationship to a slot 43, and they carry stationary guide shafts 44 and 45, (FIGS. 8 and 11) (with axes parallel to those of the shafts 34) on which a carriage slide 46 can move fore and aft. The carriage slide 46 likewise has an upper portion 47 extending up through the slot 43 and bolted to the underside of the spring-supporting member 30. Thus, the spring-supporting member 30 is slidable back and forth relative to the base plate 14 along the shafts 34, 44 and 45.

The spring-supporting member 30 is shown in section in FIG. 5; it is generally square but has a 45° angle groove 40 to receive a spring S to be tested, and it has side grooves 48 and 49. A clamping carriage 50 has rollers 51 and 52 which ride in the side grooves 48 and 49 for movement of the carriage 50 along the holder 30. A set screw 53 with an adjustment handle 54 engages a block 55 and urges it against the support 30 to hold the clamping carriage 50 at any desired position along the spring support member 30. A pneumatically actuated clamp 56 (FIG. 6) is provided on the clamping carriage 50 and comprises a clamping member 57 connected to a piston 58 that is slidably mounted in an opening 59 and is acted upon by a pneumatic pressure transmitted through a tube 60.

The load-cell face plate 26 is provided with an anvil 61 which is preferably exactly like and is nearly flush with the top groove 40 in the spring-supporting holder 30—it is very slightly higher, preferably about 0.005" above it. At the start of a spring-testing operation, the spring-receiving holder 30 lies immediately adjacent the anvil 61, and one end of the spring S rests on the anvil 61, the remainder of the spring S extending along the groove 40. The clamping carriage 50 is then brought up into position where the clamping member 57 can be brought down upon the spring S when pneumatic pressure is exerted through the tube 58. A similar clamp 62 is located in the load cell face plate 26, and a pneumatic tube 63 conducts air for actuating this clamp 62. With the spring S in position in the groove 40 with one end resting in the anvil 61 and the other end beneath the clamping member 57 of the clamping carriage 50, the operator (by devices yet to be described) actuates the pneumatic circuit so that the clamps 56 and 62 anchor the two ends of the springs. Then, the spring-supporting holder 30 is moved a predetermined distance away from the load cell face plate 26, so that the spring S pulls on the load cell 20, the resultant strain being shown by the indicator 13.

The device for moving the spring holder 30 a predetermined amount includes an air cylinder 65 (FIGS. 11 and 12) supported beneath the base plate 14 by suitable brackets 66. The air cylinder 65 has a piston 67 and a piston rod 68 that extends through a hydraulic cylinder 70, where it is provided with a piston-like disc 71, so that the hydraulic cylinder 70 with its valving circuit 71a (FIG. 12) acts as a damper to prevent the piston rod 68 from moving too rapidly when the air cylinder 60 is actuated. Two flow control valves 71b and 71c control oil flow in opposite directions, the flow being free in the direction not controlled. The piston rod 68 extends beyond the end of the hydraulic damper cylinder 70, through and beyond the guide support member 41, and is secured to the carriage slide 46. Thus, when the air cylinder 65 is actuated, its piston rod 68 moves to the right, as seen in FIGS. 2, 3, 8 and 11, and thereby causes the carriage slide 46 to move to the right on the shafts 44 and 45. As a result, the entire spring-supporting holder 30 moves to the right, the other end of it sliding on the shaft 34.

Rather than having a fixed stroke for the holder 30, one that remains invariable for all springs S of whatever length and of whatever nature, the present invention enables the operator to set the stroke exactly at a predetermined value which is suitable to the length and type of spring S being measured. For that reason, a stop member 72 (FIG. 8) is provided to engage the carriage slide 46 and prevent it from moving beyond a predetermined point. The stop member 72 is a shaft-like member having a threaded portion 73 which is rotated in a support 74 that is held stationary in the base plate 14 so as to move the stop end of the member 72 fore and aft. Any suitable means for moving the stop member 72 may be used; as shown in FIG. 8, a pair of gears 75 and 76 are used, with the stop 72 being secured to the gear 76 and with the gear 75 actuated through bevel gears 77 and 78 by a handle 79.

A dial indicator 80 is mounted on the console 10 (FIGS. 1 and 2) to show how far the moved end of the spring S will move, which is simply the setting of the stop member 72. Its indicator pointer 81 is actuated through a flexible shaft 82, which has its opposite end connected to a right angle ratio drive 83 (FIG. 8) that is actuated by the opposite end 84 of the stop member 72, which has a key 85 moving through a keyway 86. Thus, turning the handle 79 results in moving the stop member 72 longitudinally, doing two things: both setting the stop 72 for the carriage slide 46 to engage when the air cylinder 65 is actuated, and showing the operator on the dial 80 the exact amount which the carriage slide 46, and consequently the member 30 itself, will move—hence the amount which the end of the spring S secured by the clamp carriage 50 will move the air cylinder 65 is actuated.

In line with the groove 40 is a grooved roller 88 supported by antifriction bearings for as little friction as possible. The roller 88 is used for synchronizing the load-cell 20 to the indicator 13, for direct reading of the spring tensions. A cord is clamped at one end to the anvil 61 by the clamp 62, but the clamp 50 is not tightened on the cord, which also does not touch the walls of the groove 40. The other end of the cord is hung over the roller 88, and (using access through a door 89) a dead weight of known value, usually between three and twenty-seven ounces, is attached to the cord and through it pulls on the load-cell 20. The reading on the indicator 13 is then checked and, if necessary, corrected. Several checks with different weights are usually made to check linearity.

The pneumatic tube 60 which goes with the clamping carriage 50 has to lengthen and shorten as the carriage 50 is moved back and forth. To enable this to be done properly, a reeling device is provided. The tube 60 is flexible: it goes over a pulley wheel 90 that is in line with the forward end of the tube, and from there goes to a reel 91, (FIGS. 2, 3, and 9) where it is connected to a peripheral outlet 92. The reel has an inlet 93 at its center or axis (FIGS. 9 and 10) and a bore 94 connects the inlet 93 to the outlet 92, so that air is always provided in all positions thereof. The tube 60 thus winds around the reel 91 or is unrolled from it, carrying air to the clamp 56 in all positions of the clamp. The reel 90 is under pull from a spring 97 causing it to reel up the tube 90 when the carriage 50 moves to give the tube 60 some slack.

The circuit diagram, FIG. 12, shows the rather simple electrical and pneumatic circuits. Thus, from a typical A.C. socket, for example 60 cycle, 115 volt A.C., lines 100, 101 extend, with the line 100 going through an off-on switch 102, near which a signal light 103 bridges the lines 100 and 101 to show when the switch 102 is closed and the machine is on. The indicator 13 is electrically across the lines 100 and 101, with the load-cell 20 connected to the indicator 13. Switches 104 and 105 are in parallel, the switch 104 being connected to the return line 101 through a solenoid 106, while the switch 105 is connected to the return line 101 through a solenoid 107. The solenoid 106 operates an air valve 108 for the pneumatic clamping circuit of the clamps 56 and 62, while the switch 105 and solenoid 107 act to energize a valve 109 for the actuation of the air cylinder 65 that moves the spring support member 30. A suitable air supply line 110 goes through a regulator 111 to the parallel valves 108 and 109. Actuation of the valve 108 sends air through a line 112 to the pneumatic tubes 60 and 63 which operate the spring clamps 56 and 62. The circuit is provided with an arcuate switchpole 113, operated by a rotating handle 114 so that the "clamp" switch 104 remains closed while the "stretch" switch 105 is closed; therefore, the "stretch" switch 105 is never actuated without the "clamp" switch 104 being closed. While the spring S is held clamped, the solenoid 107 is energized, actuating the valve 109 and sending air to the air cylinder 65 which actuates the movement of the support member 30.

To those skilled in the art to which this invention relates, many additional changes in construction and widely differing embodiments of the invention will suggest them-

What is claimed is:

1. A machine for testing the tension exerted by an elastic specimen upon extension thereof, including in combination:
- a main frame,
- a horizontal specimen-supporting member mounted on said frame for lengthwise movement therealong and having a specimen-receiving groove extending horizontally and lengthwise on its upper surface,
- a load cell having one end secured to said frame and a second end disposed adjacent one end of said specimen-supporting member,
- first clamp means secured to said second end of said load-cell and mounted on said frame for relative lengthwise movement with respect thereto, said first clamp means having a specimen-receiving anvil substantially level with said specimen-receiving groove and next to the one end thereof,
- second clamp means for clamping an end of said specimen into said groove, so that a specimen can be laid in said groove with one end clamped at said first clamp means and the other end clamped at said second clamp means,
- means for moving said horizontal specimen-supporting member, along with said second clamp means, away from said first clamp means, so that said specimen pulls on said load-cell, and
- means for indicating the strain exerted on said load-cell.

2. A machine for testing the tension exerted by a spring upon extension thereof, including in combination:
- a main frame,
- a horizontal spring-supporting member mounted on said frame for lengthwise movement therealong and having a spring-receiving groove extending horizontally and lengthwise on its upper surface,
- a load cell having one end secured to said frame and a second end disposed adjacent one end of said spring-supporting member,
- first clamp means secured to said second end of said load-cell and mounted on said frame for relative lengthwise movement with respect thereto, said first clamp means having a spring-receiving anvil substantially level with said spring-receiving groove and next to the one end thereof,
- second clamp means for clamping an end of said spring into said groove, mounted on said spring-supporting member for movement back and forth therealong and having means for securing it rigidly to said spring-supporting member at any desired position therealong, so that a spring can be laid in said groove with one end at said first clamp means and the other end at said second clamp means,
- actuation means for causing both said clamp means to clamp against said spring,
- means for moving said horizontal spring-supporting member, along with said second clamp means, which is secured rigidly thereto during operation, away from said first clamp means, so that said spring pulls on said load-cell, and
- means for indicating the strain exerted on said load-cell.

3. A machine for testing the tension exerted by a helical spring upon extension thereof, including in combination:
- a main frame,
- a horizontal spring-supporting member movably mounted on said frame and having a spring-receiving groove extending horizontally along its upper surface,
- a load-cell having one end secured to said frame and a second end disposed adjacent one end of said spring-receiving groove member and in line therewith,
- first clamp means movably mounted on said frame for movement in the direction of said groove and secured to said second end of said load-cell and having a spring-receiving anvil substantially level with said spring-receiving groove and next to the one end thereof,
- second clamp means for clamping an end of said spring into said groove, employing the bottom of said groove as an anvil, said second clamp means being mounted on said spring-supporting member for lengthwise movement back and forth therealong,
- means for securing said second clamp means rigidly to said spring-supporting member at any desired position therealong, so that a spring to be tested can be laid in said groove with one end on the anvil of said first clamp means and the other end beneath said second clamp means,
- actuation means for causing both said clamp means to clamp against said spring at their respective loci,
- means for moving said horizontal spring-supporting member, along with said second clamp means, which is secured rigidly thereto during operation, a predetermined distance lengthwise of said groove and away from said first clamp means, so that said spring pulls on said load-cell, and
- means for indicating the strain exerted on said load-cell by the pull of said spring.

4. A machine for testing the tension exerted by a spring upon extension thereof, including in combination:
- a main frame,
- a horizontal spring-supporting member mounted on said frame for lengthwise movement therealong and having a spring-receiving groove extending horizontally and lengthwise on its upper surface,
- strain-sensitive means having a first portion secured to said frame and a second portion disposed adjacent one end of said spring-supporting member,
- first clamp means secured to said second portion of said strain-sensitive means and mounted on said frame for relative lengthwise movement with respect thereto, said first clamp means having a spring-receiving anvil substantially level with said spring-receiving groove and next to the one end thereof,
- second clamp means for clamping an end of said spring into said groove, so that a spring can be laid in said groove with one end clamped at said first clamp means and the other end clamped at said second clamp means,
- means for moving said horizontal spring-supporting member, along with said second clamp means, away from said first clamp means, so that said spring pulls on said strain-sensitive means, and
- means for indicating the strain exerted on said strain-sensitive means.

5. A machine for testing the tension exerted by a spring upon extension thereof, including in combination:
- a main frame,
- first and second stationary shaft means mounted on said frame and spaced apart from each other longitudinally,
- a horizontal spring-supporting member mounted on said first and second shaft means for lengthwise movement therealong and having on its upper surface a spring-receiving groove extending horizontally and lengthwise of said shafts,
- strain-sensing means having a first portion stationary with respect to said frame and a second portion disposed adjacent one end of said spring-supporting member,
- third stationary shaft means mounted on said frame adjacent said strain-sensing means and extending in the same direction as said first and second stationary shaft means,
- first clamp means secured to said second end of said strain-sensing means and mounted on said third shaft means for relative lengthwise movement therealong, said first clamp means having a spring-receiving anvil substantially level with said spring-receiving groove and next to the one end thereof and having clamp-closure means, second clamp means having clamp-closure means for clamping an end of said spring against said groove, so that a spring can be laid in said groove with one end in the anvil of said first clamp means and the other end beneath the clamp-closure means of said second clamp means, impelling means secured to said frame for moving said horizontal spring-supporting member on said first and second shaft means away from said first clamp means, so that said spring pulls on said strain-sensing means, means indicating the strain exerted on said strain-sensing means, adjustable stop means supported by said frame for lengthwise movement therealong to limit the amount of movement which said impelling means can impart to said spring-supporting member, and indicator means on said frame connected to said stop means for indicating the position of said stop means and the amount of movement that is to be imparted to said frame upon actuation of said impelling means.

6. The machine of claim 5 wherein said second clamp means has a carriage mounted on said spring-supporting member for movement back and forth therealong and has means for securing it rigidly to said spring-supporting member at any desired position therealong.

7. The machine of claim 6 wherein both said clamp closure means are pneumatically operated, said machine having a flexible pneumatic conduit with one end connected to said second clamp means and a second end, a rotatable reel having a peripheral outlet connected to said second end of said pneumatic conduit and an axial inlet and a bore connecting said inlet to said outlet, for reeling and unreeling said conduit as said second clamp means moves back and forth, and first pneumatic means for causing both said pneumatic clamp closure means to clamp their respective ends of said spring, means for moving said horizontal spring-supporting member, along with said second clamp means, which is secured rigidly thereto during operation, a predetermined distance lengthwise of said groove and away from said first clamp means, so that said spring pulls on said load-cell, and means for indicating the strain exerted on said load-cell by the pull of said spring.

8. A machine for testing the tension exerted by a spring upon extension thereof, including in combination:

a main frame, first and second stationary shaft means mounted on said frame and spaced apart from each other longitudinally, a horizontal spring-supporting member mounted on said first and second shaft means for lengthwise movement therealong and having on its upper surface a spring-receiving groove extending horizontally and lengthwise of said shafts, a load cell having one end secured to said frame and a second end disposed adjacent one end of said spring-supporting member, third stationary shaft means mounted on said frame adjacent said load cell and extending in the same direction as said first and second stationary shaft means, first clamp means secured to said second end of said load cell and mounted on said third shaft means for relative lengthwise movement therealong, said first clamp means having a spring-receiving anvil substantially level with said spring-receiving groove and next to the one end thereof and having clamp-closure means, second clamp means having clamp-closure means for clamping an end of said spring against said groove, so that a spring can be laid in said groove with one end in the anvil of said first clamp means and the other end beneath the clamp-closure means of said second clamp means, impelling means secured to said frame for moving said horizontal spring-supporting member on said first and second shaft means away from said first clamp means, so that said spring pulls on said load cell, means indicating the strain exerted on said load cell, adjustable stop means supported by said frame for lengthwise movement therealong to limit the amount of movement which said impelling means can impart to said spring-supporting member, and indicator means on said frame connected to said stop means for indicating the position of said stop means and the amount of movement that is to be imparted to said frame upon actuation of said impelling means.

9. The machine of claim 8 wherein said second clamp means has a carriage mounted on said spring-supporting member for movement back and forth therealong and has means for securing it rigidly to said spring-supporting member at any desired position therealong.

10. The machine of claim 9 wherein both said clamp closure means are pneumatically operated, said machine having a flexible pneumatic conduit with one end connected to said second clamp means and a second end, a rotatable reel having a peripheral outlet connected to said second end of said pneumatic conduit and an axial inlet and a bore connecting said inlet to said outlet, for reeling and unreeling said conduit as said second clamp means moves back and forth, and first pneumatic means for causing both said pneumatic clamp closure means to clamp their respective ends of said spring.

11. The machine of claim 8 wherein said impelling means is a pneumatic cylinder secured to said frame and a piston rod engaging a portion of said spring-supporting member.

12. A machine for testing the tension exerted by a spring upon extension thereof, including in combination:

a main frame, first and second pairs of parallel shafts mounted on said frame with the pairs adjacent opposite ends of said frame, a horizontal spring-supporting member mounted on said first and second pairs of parallel shafts for lengthwise movement therealong and having on its upper surface a spring-receiving groove extending horizontally and lengthwise of said shafts.

a load cell having one end secured to said frame and a second end disposed adjacent one end of said spring-supporting member, a third pair of parallel shafts mounted on said frame adjacent said load cell and extending in the same direction as said first and second pairs of parallel shafts, first clamp means secured to said second end of said load cell and mounted on said third pair of parallel shafts for relative lengthwise movement therealong, said first clamp means having a spring receiving anvil substantially level with said spring-receiving groove and next to the one end thereof and having a pneumatically actuated clamp-closure means, second clamp means having a pneumatically actuated clamp-closure means for clamping an end of said spring into said groove, said second clamp means having a carriage mounted on said spring-supporting member for movement back and forth therealong and having means for securing it rigidly to said spring-supporting member at any desired position therealong, so that a spring can be laid in said groove with one end in the anvil of said first clamp means and the other end beneath the clamp-closure means of said second clamp means, a flexible pneumatic conduit with one end connected to said second clamp means and a second end, a rotatable reel having a peripheral outlet connected to said second end of said pneumatic conduit and an axial inlet and a bore connecting said inlet to said outlet, for reeling and unreeling said conduit as said second clamp means moves back and forth, first pneumatic means for causing both said pneumatic clamp closure means to clamp said spring against the respective anvils, a pneumatic cylinder secured to said frame and having a piston and piston rod secured to said horizontal spring-supporting member for moving it away from said first clamp means, so that said spring pulls on said load cell, means indicating the strain exerted on said load cell, stop means supported by said frame for lengthwise movement therealong to limit the amount of movement which said pneumatic cylinder can impart to said spring-supporting member, and indicator means on said frame connected to said stop means for indicating the position of said stop means and the amount of movement that is to be imparted to said frame upon actuation of said piston rod.

13. The device of claim 12 wherein said piston rod is provided with a piston-like disc and extends through a hydraulic cylinder secured to said frame with said disc inside said hydraulic cylinder to act as a damper for movement of said spring-supporting member enabling smooth movement thereof, said cylinder having a valved circuit to enable flow of fluid to and from each side of said disc at a controlled rate.

14. The device of claim 12 having said anvil slightly higher than said groove and a roller supported by anti-friction means on said frame in line with said groove and beyond said spring-supporting member for calibrating said load-cell by means of known deadweights hung on a cord that is clamped to said anvil and passes over said roller.

References Cited by the Examiner
UNITED STATES PATENTS

| | | | |
|---|---|---|---|
| 1,850,742 | 3/1932 | Collins | 73—161 |
| 2,706,404 | 4/1955 | Schiesel | 73—161 X |
| 3,120,306 | 2/1964 | Gogan | 73—161 X |

FOREIGN PATENTS

| | | |
|---|---|---|
| 314,925 | 10/1919 | Germany. |

LOUIS R. PRINCE, *Primary Examiner.*

DAVID SCHONBERG, RICHARD QUEISSER,
*Examiners.*